United States Patent

[11] 3,628,886

[72] Inventor Tore Anton Andvig
 Kongsberg, Norway
[21] Appl. No. 879,818
[22] Filed Nov. 25, 1969
[45] Patented Dec. 21, 1971
[73] Assignee A/S Kongberg Vapenfabrikk
 Kongsberg, Norway
[32] Priority Nov. 15, 1968
[33] Norway
[31] 4692/68

[54] ARRANGEMENT FOR ENDWISE CLAMPING TOGETHER THE HUBS OF TWO SECTIONS OF A GAS TURBINE ROTOR
2 Claims, 1 Drawing Fig.

[52] U.S. Cl.................................................. 416/183, 416/244
[51] Int. Cl.................................................. F01d 5/04
[50] Field of Search.......................................... 440/204, 237; 416/182–188, 244, 204, 237

[56] References Cited
UNITED STATES PATENTS
2,941,780   6/1960   Nuell et al. .................. 416/182
3,065,954  11/1962   Whitaker....................... 416/183
3,424,433   1/1969   Langshur....................... 416/237
FOREIGN PATENTS
248,083   1/1948   Switzerland.................. 416/204
269,605  10/1950   Switzerland.................. 416/244

Primary Examiner—Everette A. Powell, Jr.
Attorney—Holman and Stern

ABSTRACT: The invention comprises an improved clamping device for clamping the hub of a first section of a gas blade wheel or rotor to the hub of a second section of blade wheel or rotor. The latter hub has a protruding pin located within a bore in the first hub. Adjacent the second hub the bore of the first hub has a shoulder facing the opposite end. A tension sleeve is secured to the pin and a compression sleeve surrounding the tension sleeve abuts the shoulder with its inner end. Both sleeves are located within the bore. A tensioning bolt abuts with its head the opposite end of the compression sleeve and threadedly engages the tension sleeve. There is a considerable clearance between the compression sleeve and the walls of the bore and only very little clearance between the two sleeves.

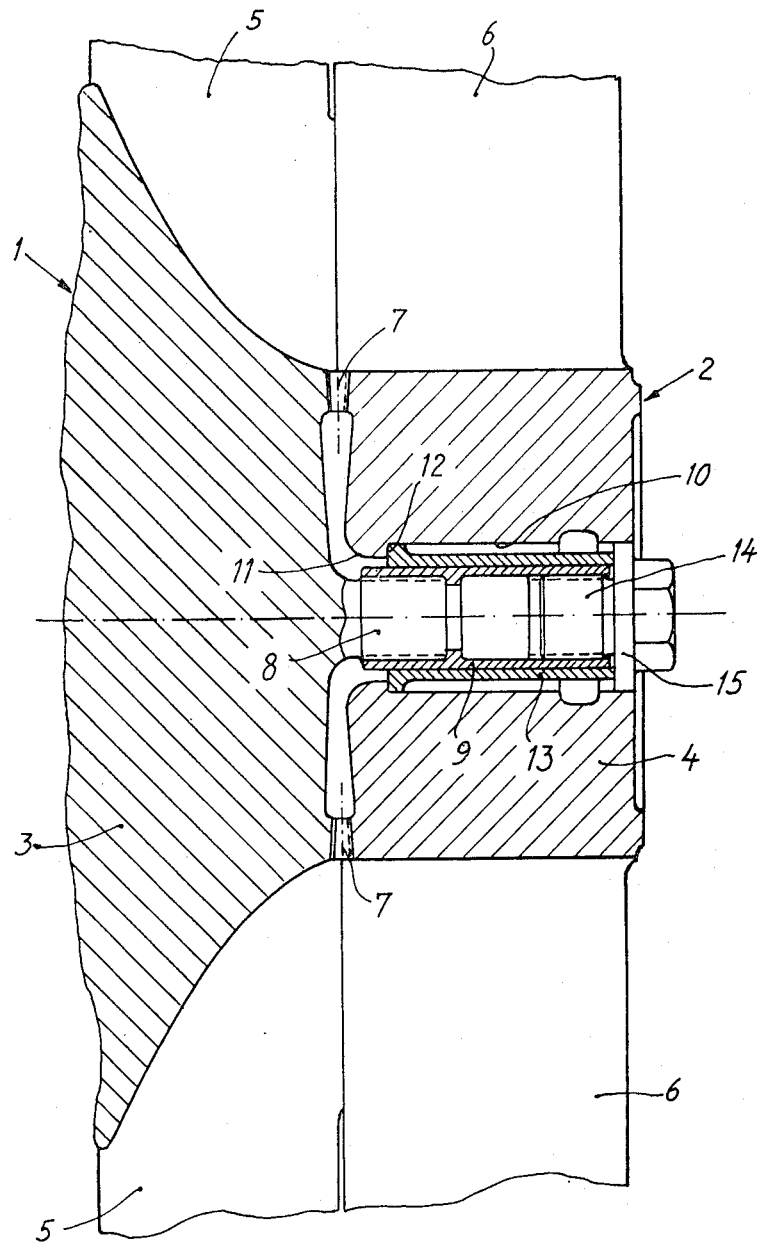

ARRANGEMENT FOR ENDWISE CLAMPING TOGETHER THE HUBS OF TWO SECTIONS OF A GAS TURBINE ROTOR

BACKGROUND OF THE INVENTION

The present invention relates to an arrangement for endwise clamping together the hubs of two sections of a blade which on motor of a gas turbine, in which a connecting means protruding from the end face of one hub extends through a central bore in the other hub and transfers an axial clamping force thereto.

Rotors and blade wheels in radial gas turbines are for convenience in manufacture often made in two sections which are clamped together endwise. The clamping may for instance be effected by means of a connecting bolt protruding from the end face of one hub and extending through a central bore in the other hub. The axial clamping force on the hub having the bore may be provided by a nut or a bolt head engaging the outer end face of this hub.

When the gas turbine is put into operation the hub will be heated and expands in the axial direction. When the blade wheel been in operation for some time and has become hot throughout, also the connecting bolt will have approximately the same temperature as the hub and therefore exhibit a corresponding elongation. However, in a transient heating period the hub will be hotter than the connecting means, and this fact may introduce stresses in the connecting means beyond the yield point and thereby produces a permanent elongation of the connecting means and a loosening of the clamping when the hub and the bolt again assume the same temperature and heat expansion.

SUMMARY OF THE INVENTION

The object of the present invention is to provide a clamping arrangement of the kind initially referred to, in which the central connecting means is not subjected to stresses of such a magnitude under transient temperature conditions that permanent elongations that might cause loosening of the connection, are experienced in the connecting means.

According to the invention this is achieved by transferring the clamping force between the connecting means and the hub provided with the central bore through a compression sleeve surrounding the connecting means. Whereas the hub itself has a solid cross section that is too large for being substantially compressed by the compressive forces, a compression sleeve that is located in the bore and of course has a substantially smaller cross section than the hub, will be elastically compressed, whereby the elongation, and hence the stress increase in the connecting means will be significantly reduced.

The compression sleeve is positioned within the bore and with its inner end abutting against a shoulder in the bore. The sleeve is further designed so as to provide a considerable clearance between the sleeve and the walls of the bore in the hub, while preferably only a sliding clearance is left between the compression sleeve and the connecting means. Thereby the compression sleeve will be heated considerably more slowly than the hub and have a temperature that is very close to the temperature of the connecting means. The heat expansion that has to be accommodated by the connecting means when the temperature difference between the hub and the connecting means has its maximum value, is thereby significantly reduced, since only a small part of the linear heat expansion of the hub is transferred to the connecting means, without the necessity of making this means correspondingly shorter.

It will be evident that the elasticity of the clamping effect may be increased by using a series of coaxial sleeves mutually engaging each other at the ends, for instance an inner and an outer compression sleeve and an intermediate tension sleeve, the clearance between adjacent sleeves being preferably small, and the clearance between the outer compression sleeve and the walls of the bore in the hub being relatively large.

Further, according to the invention the connecting means consists of a tension sleeve connected to said one hub, and a securing member that threadedly engages the tension sleeve and also engages an end of the compression sleeve. Since the connecting means has the form of a sleeve the major part of the material in the connecting means is closer to the compression sleeve, whereby the temperatures of the connecting means and the compression sleeve, respectively, can be kept closer together under transient temperature conditions. The embodiment also provides advantages with respect to strength and manufacture. A sleeve that is connected to a pin protruding from the end face of said one hub, for instance by means of a threaded connection, is thus for reasons of strength preferable to a bolt threaded into said hub. A short protruding pin on said one hub is of course considerably cheaper to produce than a long bolt-shaped pin of sufficient length for extending through the bore of said other hub and itself serve as a connecting means.

The tensioning member may consist of a nut engaging exterior threads on the tension sleeve or of a head bolt engaging interior threads in the sleeve.

DESCRIPTION OF THE PREFERRED EMBODIMENT

An embodiment of the arrangement according to the invention will now be described, reference being had to the accompanying drawing.

In the drawing there is illustrated a sectional view of a turbine blade wheel for a radial turbine. The blade wheel is assembled from two parts 1 and 2, each having a hub 3 and 4, respectively, and blades 5 and 6, respectively. The hubs 3 and 4 engage each other endwise and are centered on each other by means of a known tooth coupling 7. The hub 3 has a centrally protruding threaded pin 8 onto which there is inserted a threaded sleeve 9. The threaded connection between the pin 8 and the sleeve 9 will normally not be disconnected, and the sleeve 9 may therefore also be connected to the hub 3 in other ways than by the threaded connection illustrated.

The sleeve 9 is positioned within a central bore 10 in the hub 4. At the end of the hub 4 adjacent the hub 3 the bore 10 is restricted as illustrated at 11 so as to form an annular shoulder 12. A compression sleeve 13 is located within the bore 10 with its inner end engaging the shoulder 12 and having its outer end adjacent the other end of the bore. A head bolt 14 is threaded into the tension sleeve 9 and engages the outer end of the compression sleeve 13 through an integral or a separate flange 15.

When the hub 4 is heated due to the hot gases flowing past the blades 6, the axial length of the hub 4 increases. As long as the tension sleeve 9 is considerably colder than the hub 4, such an increase in length will if transferred to said sleeve produce a very high stress therein. Due to the fact that the distance between the flange 15 and the abutment plane 7 between the two hubs 3 and 4 is to a great extent spanned by the compression sleeve 13, which has substantially the same temperature as the connecting sleeve 9, the linear heat expansion transferred to the sleeve 9 while this sleeve is still substantially colder than the hub 4, will be considerably smaller than if the flange 15 were resting against the outer end face of the hub 4. In addition, the compression sleeve 13 is somewhat compressed and thus further reduces the strain in the connecting means 9 caused by transient temperature differences. Thereby it is possible to keep the stress in the connecting means 9 sufficiently low to prevent occurrence of permanent deformations that might cause loosening of the connection.

What I claim is:

1. In an arrangement for endwise clamping of a gas turbine blade wheel member having a hub with a central bore, to another member of a gas turbine rotor, a bore-region adjacent the said other member having a shoulder facing away from said other member; connecting means secured to said other member to protrude from its end face into the central bore to extend past said shoulder; securing means engaging the connecting means at its free end and having a shoulder which faces said other member, the securing means securingly holding the two members in assembly; a tubular compression means with its ends abutting said shoulders, the improvement being that the compression means includes a tubular one piece having a flange at one end engaging said first-mentioned shoulder, said sleeve being disposed in close sliding relation around the connecting means and arranged in spaced substantially parallel relation with an inside surface of the bore so as to form an annular gap therebetween, whereby said sleeve and connecting means are at substantially the same temperature at transient temperature conditions.

2. The arrangement as claimed in claim 1, in which said securing means comprises a flanged bolt with its flange forming said shoulder which faces said other member, and wherein the connecting means includes an elongated member secured at one end to said other member and adapted to receive said flanged bolt at the other and wherein the compression sleeve is clamped at its end faces between the shoulder of the hub and the flange of the bolt.

* * * * *